United States Patent [19]

Freeman et al.

[11] Patent Number: 5,640,334
[45] Date of Patent: Jun. 17, 1997

[54] METHOD OF RECALIBRATING ELECTRONIC SCALES

[75] Inventors: Gerald C. Freeman, Norwalk; Paul C. Talmadge, Ansonia, both of Conn.

[73] Assignee: Pitney Bowes Inc., Stamford, Conn.

[21] Appl. No.: 165,152

[22] Filed: Feb. 23, 1994

[51] Int. Cl.$^6$ .............................. G01G 19/00; G01G 23/01
[52] U.S. Cl. .................... 364/571.05; 364/571.02; 364/567; 73/1.13; 177/25.13
[58] Field of Search .................. 364/567, 571.01, 364/571.02, 571.05, 568; 177/25.11, 25.12, 25.13, 3; 73/1 R, 1 B

[56] References Cited

U.S. PATENT DOCUMENTS

| | | | |
|---|---|---|---|
| 4,550,792 | 11/1985 | Mosher et al. | 177/25.18 |
| 4,651,838 | 3/1987 | Hamilton et al. | 177/209 |
| 4,660,663 | 4/1987 | Amacher et al. | 177/50 |
| 4,718,507 | 1/1988 | Howlett et al. | 177/210 FP |
| 4,760,539 | 7/1988 | Amacher et al. | 364/571 |
| 4,782,904 | 11/1988 | Brock | 177/185 |
| 4,836,308 | 6/1989 | Davis et al. | 177/25.14 |
| 4,890,246 | 12/1989 | Oldendorf et al. | 364/567 |
| 4,909,338 | 3/1990 | Vitunic et al. | 177/50 |
| 4,932,487 | 6/1990 | Melcher et al. | 177/50 |
| 5,050,693 | 9/1991 | Wirth et al. | 177/200 |

*Primary Examiner*—Emanuel T. Voeltz
*Assistant Examiner*—M. Kemper
*Attorney, Agent, or Firm*—Angelo N. Chaclas; Robert H. Whisker; Melvin J. Scolnick

[57] ABSTRACT

Disclosed is a method of recalibrating an electronic scale to maintain accurate weight measurements of a scale regardless of variations in the physical and/or environmental conditions under which the scale is operating between a site of origin and a site of installation which tend to adversely affect accurate weight. Also disclosed is method of obtaining an accurate indication of the weight of an article by an electronic scale at a site of installation regardless of variations in the physical and/or environmental conditions under which the scale is operating between a site of origin and the site of installation which tend to adversely affect accurate weight. Both methods are accomplished by recalibrating the scale to adjust the output of certain electronic control components to compensate for the difference in the physical and/or environmental conditions between the two sites which tend to adversely affect accurate weight indications of the scale.

9 Claims, 10 Drawing Sheets

FIG. 13
Site of Origin
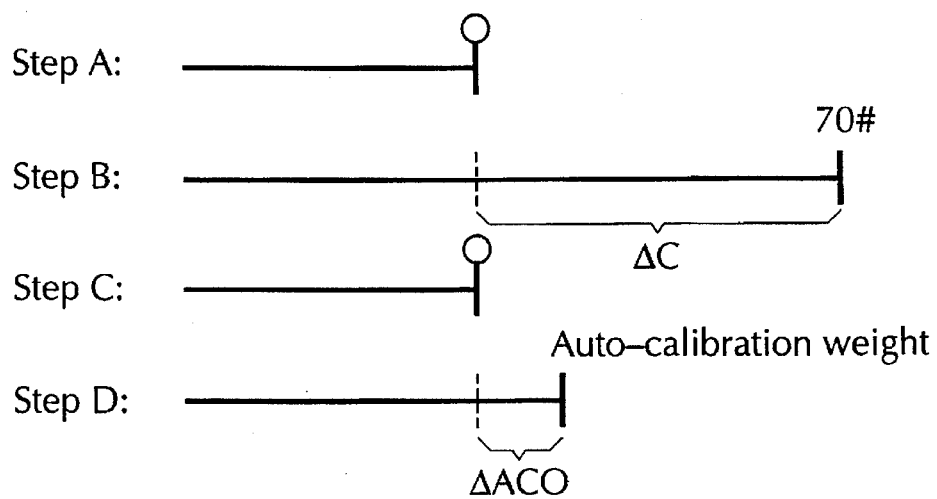
Site of Installation
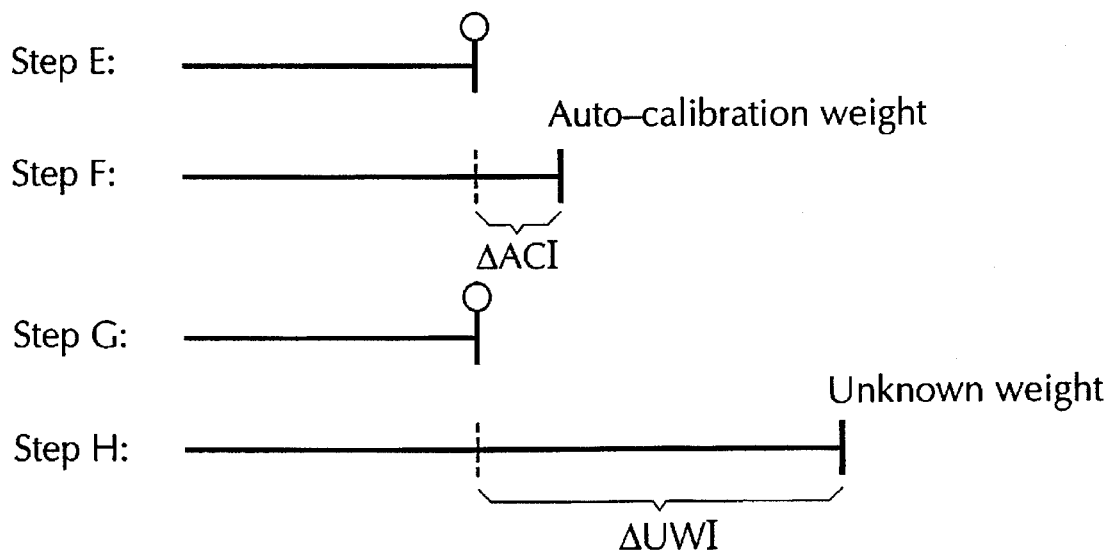

METHOD OF RECALIBRATING ELECTRONIC SCALES

BACKGROUND OF THE INVENTION

This invention relates generally to the field of electronic weighing scales, and more particularly to a method for recalibrating such scales to compensate for the effects on the accuracy of the scales of variations in physical and/or environmental conditions under which the scales operate.

This application is related to copending application Ser. No. 08/165,151, filed Dec. 12, 1993, issued on Aug, 27, 1996 as U.S. Pat. No. 5,550,328, in the name of Gerald C. Freeman and Paul C. Talmadge, and assigned to the assignee of this application.

Since their introduction, electronic scales have become widely accepted in many weighing applications for a number of reasons, primarily the extreme degree of accuracy with which the scales can weigh articles, the wide range of weights the scales are capable of handling and the ease and convenience of digital display readout of the weight of an article. Electronic scales are now used almost exclusively in such high volume utility situations as mail, parcels, bulk food and dry goods sold by weight measure, air terminal baggage, and other situations where highly accurate weight is required on a repetitive basis with minimum recovery time between individual weighings.

In recent years, electronic scales have become almost the universal standard in connection with weighing mail and parcels, and it is in connection with this utility that the present invention was developed, although the utility of the present invention is by no means limited to this use. Perhaps the primary contributing factor to the popularity of electronic scales in the postal field is the high degree of accuracy inherent in such scales. When one considers the billions of mail pieces weighed anually by the U.S. Postal Service in the course of handling mail, and the millions of packages and parcels also handled not only by the Postal Service but also by all of the special delivery courier services which compete with the Postal Service, one can begin to appreciate the vast amount of money, by which customers will be overcharged or undercharged depending on whether scales are overweighing or underweighing, in the course of dispatching all of this mail and parcels if the scales which determine the mail and parcel postage amount are not highly accurate.

For example, a generaly accepted standard of accuracy among major electronic scale manufacturers is that they be within 0.03% to 0.05% of full scale. If we assume a 100 pound scale, the required accuracy becomes 0.03 to 0.05 pounds, or 0.48 to 0.80 onces, over the range of the scale. Thus, it is apparent that electronic scales are capable of weighing accurately to an impressive less than one ounce in 100 pounds. Correspondingly, a one pound letter scale can weigh letter mail accurately to within less than one one hundreth of an ounce.

Aside from an inherent desire to provide highly accurate scales for monetary purposes described below, a major factor contributing to this high degree of accuracy is the requirement by the National Bureau of Weights and Measures that a scale be capable of weighing within the above limits of accuracy in order to be approved for commercial use in mail and parcel applications. Although many customers in other applications may not require this degree of accuracy, customers in the mail and parcel fields will not purchase scales that are not capable of National Bureau of Weights and Measures approval.

A major problem that occurs with electronic load cell scales is that the accuracy of the scales can be adversely affected by variations of certain physical and/or environmental conditions under which the scales are required to operate. A primary physical condition is that an electronic load cell scale must be absolutely level during operation or it will not weigh accurately. Thus, if a scale is properly calibrated at the factory on a test bench known to be perfectly level, and is then transported to the field and operated on a surface that is not as level as the factory test bench, the scale will not weigh accurately. Tests have revealed that a scale resting on a surface which is tipped only a few degrees off of factory test bench level can have a weight discrepancy of as much as 0.4% to 0.5% of full scale, which translates into an accuracy of about 10 times less than the above mentioned industry standard. The reason for this is that when a scale is perfectly level, an article resting on the platform of the scale is exerting 100% of its weight in a perfectly vertical direction relative to gravity, so the scale recognizes the full weight of the article. If the scale is tipped slightly, the weight of the article recognized by the scale is no longer 100%, but rather is only a component of the weight as determined by the cosine effect, one minus the cosine of the angle that the scale is off level. The result is that the scale reads less than the true weight of the article by the amount of the above percentages, which becomes very substantial in terms of lost revenue from underweighing millions of parcels. This problem could be particularly acute in the situation where a courier service wishes to place a scale in the back of its pickup truck in order to check the accuracy of package weight provided by the customer prior to the package being delivered to the distribution center of the courier service. It is rare that a parked truck will be absolutely level, with the result that a substantial degree of error is introduced into the weight provided by the customer.

The problem is further compounded by the introduction of various environmental factors, such as variations in gravity, vibration, temperature, air movement, electronic noise, and shift errors on the platform. For example, it is known that the force of gravity varies from place to place around the world, with the result that a scale properly calibrated at the factory may not be accurate within the desired limits after it is transported a few hundred or a few thousand miles. Also, the effect of gravity varies with height, so that a scale calibrated properly at sea level may not be accurate within the desired limits in Denver. A scale properly calibrated in an air conditioned factory at a temperature of 75° F. may not be accurate when used in a non-air conditioned location with an ambient temperature of 98° F. Air movement is another contributing factor, so that a scale operating under the influence of air movement impinging on the platform from an air conditioning outlet may not be accurate after having been calibrated at the factory in still air.

Prior to the present invention, the only way to ensure that a particular scale would weigh accurately in the field was to dispatch a service technician of the scale manufacturer to the site of the scale for the purpose of recalibrating the scale after it is installed and is operating under the conditions which appertain. This obviously is not an acceptable solution since it is not a cost effective procedure, it does not solve the problem of changing circumstances at the scale site, such as temperature, air movement, electronic noise, etc., and it certainly does not solve the problem of transitory scales, such as those installed in the back of courier services' pickup trucks, and finally it is most difficult on the service technicians who must carry anywhere from 50 to 100 pounds of weight to the site of the scale in order to perform the calibration.

3

Thus, from the foreging it is seen that there exists a need for an effective way of recalibrating electronic scales in the field to compensate for errors in weight which are introduced by the adverse effects of physical and/or environmental conditions under which the scales operate.

BRIEF DESCRIPTION OF THE INVENTION

The present invention satisfies the foregoing need and at least obviates if not eliminates all of the problems discussed above relating to the accuracy of electronic scales. And while the invention is disclosed herein as being practiced in conjunction with the same apparatus as that disclosed above and disclosed and claimed in the aforementioned copending application, it nevertheless can be practiced apart from that particular apparatus, and therefore has separate and unique utility in the art.

The present invention is a method of recalibrating an electronic scale to indicate accurate weight measurements of articles placed on the scale regardless of variations in the physical and/or environmental conditions under which the scale is operating between a site of origin and a site of installation and which tend to adversely affect accurate weight. The method is typically practiced in conjunction with an electronic scale which has a load cell capable of producing an analog voltage output signal indicative of the weight of all article placed on the scale, an analog to digital converter for converting the analog voltage output signal from the load cell into digital information representing the analog output, a digital readout for displaying the weight of the article, and a microprocessor for converting the digital representation of the analog output of the load cell into information for driving the digital readout to cause it to display desired information.

In this environment, its broader aspects, the method of the present invention includes the steps of placing the scale on a surface which is known to be horizontal with respect to gravity at a site of origin having certain controlled physical and/or environmental conditions, then determining a first electronic count differential between the scale with 0 or no weight applied to the scale platform and with a fixed predetermined weight thereon, and then placing that first electronic count differential into an electronic memory. The next step is removing the scale from the site of origin to a site of installation at which the scale may operate under physical and/or environmental conditions different from those which prevailed at the site of origin. At that location, the method includes the steps of again determining another or second electronic count differential between the scale with 0 weight thereon and with the aforementioned fixed predetermined weight thereon. The final step is to compare the first electronic count differential with the second electronic count differential to establish a ratio of the second electronic count differential to the first electronic count differential, which ratio will be indicative of the degree of error of the electronic count differential at the site of installation between the scale with 0 weight thereon and with an unknown weight placed thereon at the site of installation.

In some of its more limited aspects, the steps of determining the first and second electronic count differentials comprises the steps of determining an electronic count of the scale with 0 weight thereon, placing the fixed predetermined weight on the scale, determining an electronic count of the scale with the fixed predetermined weight thereon, and subtracting the electronic count of the scale with 0 weight thereon from the electronic count of the scale with the fixed predetermined weight thereon, and performing these four steps at both the site of origin and the site of installation for determining the first and second electronic count differentials respectively.

The invention also contemplates a method of obtaining an accurate indication of the weight of an article by an electronic scale at a site of installation which includes all of the steps set forth above for carrying out the method of recalibrating the electronic scale, plus additional steps which are carried out subsequent to completion of the recalibration of the scale which cause the scale to provide an indication of the accurate weight of the article. Thus, this aspect of the invention includes the steps of determining still another electronic count differential between the scale with 0 weight thereon and with the article of unknown weight thereon, multiplying the third electronic count differential by the ratio of the second electronic count differential to the first electronic count differential to compensate for the difference in physical and/or environmental conditions under which the scale is operating at the site of installation, and coverting the now adjusted third electronic couont differential to information recognizable by the digital readout for driving the digital readout to cause it to display the actual weight of the article.

Having briefly described the general nature of the invention, it is a principal object thereof to provide a method of recalibrating an electronic scale to indicate accurate weight measurements of articles placed on the scale regardless of variations in the physical and/or environmental conditions under which the scale operates between a site of origin and a site of installation and which tend to adversely affect accurate weight.

Another object of the present invention is to provide a method of obtaining an accurate indication of the weight of an article placed on an electronic scale at a site of installation regardless of variations in the physical and/or enviornmental conditions under which the scale is operating between a site of origin and the site of installation which tend to adversely affect accurate weight.

Another object of the present invention is to provide a method of indicating accurate weight measurements of articles placed on the a scale as aforesaid which is applicable to a variety of electronic scales and is easy to practice by the average user of the scale.

These and other objects, advantages and features of the method of the present invention will become more apparent from an understanding of the following detailed description of a preferred embodiment of the invention when considered in conjunction with the accompanying drawings.

DESCRIPTION OF THE DRAWINGS

FIG. 13 is a schematic illustration of the activity performed by the electronic components shown in FIG. 12 during the practice of the method of the present invention.

DETAILED DESCRIPTION OF THE INVENTION

In order to fully understand the method of the present invention, it will be helpful to understand the construction and operation of the electronic scale apparatus disclosed and claimed in the aforementioned copending application, pursuant to which the Detailed Description of the Invention portion of the specification of that application is set forth herein, accompanied by the drawings of that application.

Figure 1:
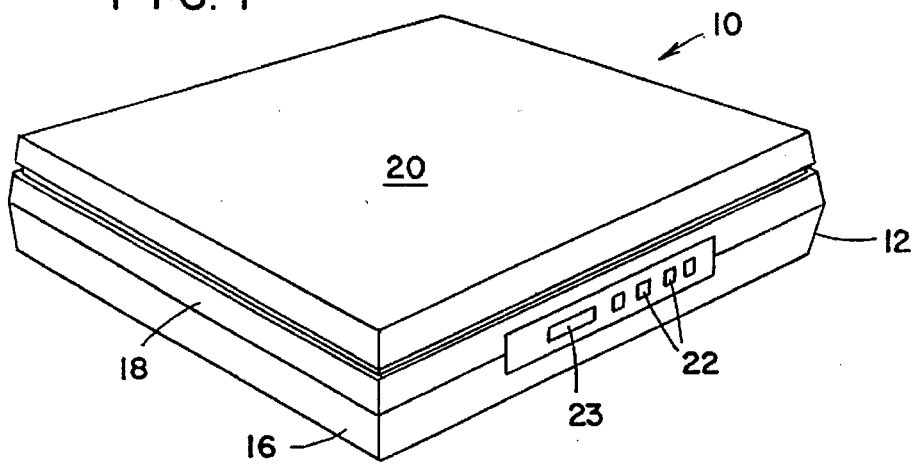
FIG. 1 is a perspective view of a representative scale including an automatic recalibration apparatus utilizing the principles of the present invention.
Figure 2:
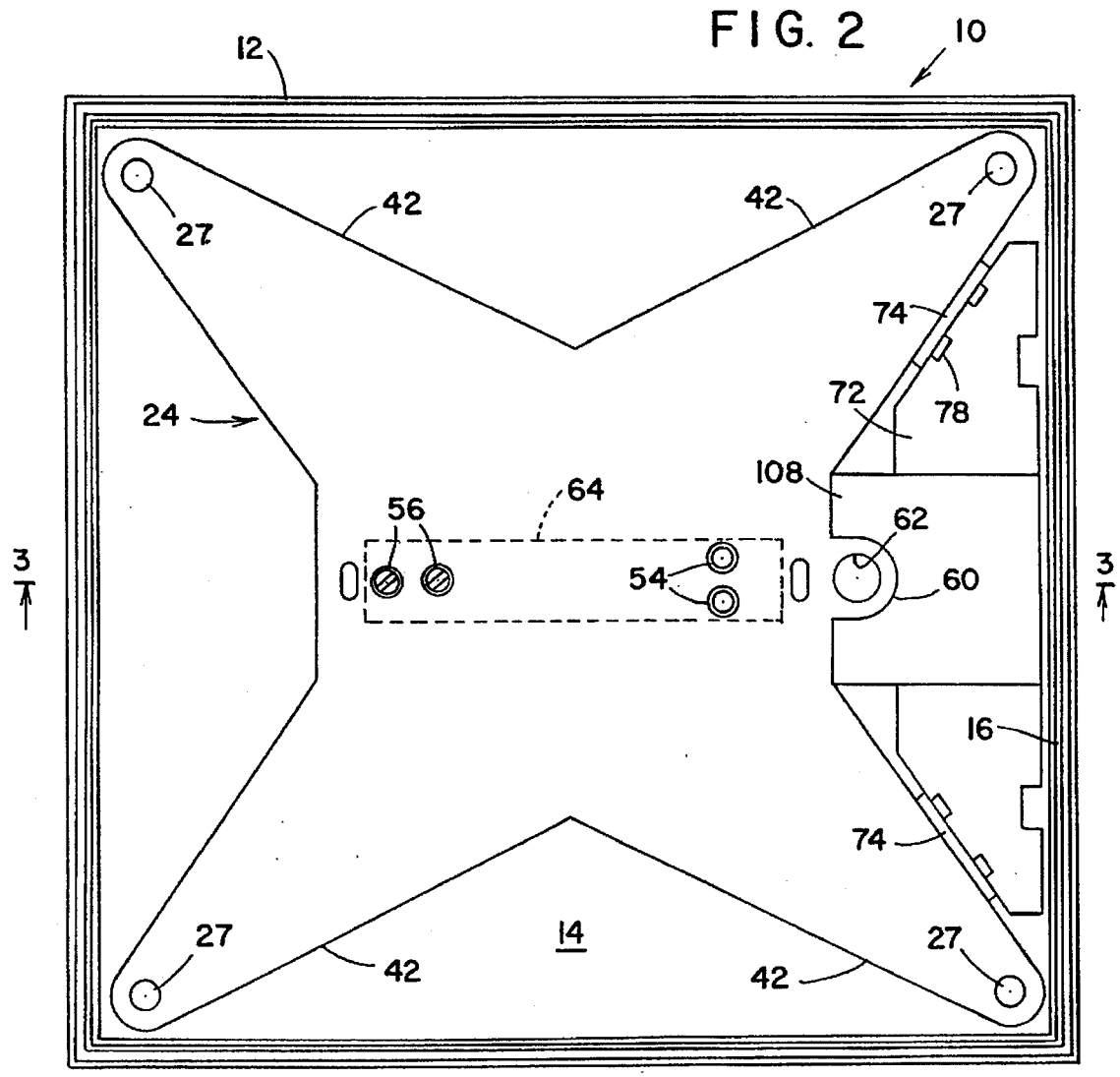
FIG. 2 is a plan view of the scale shown in FIG. 1 with the scale platform removed to reveal interior detail.

Referring first to FIGS. 1 and 2, it will be seen that the recalibrating device of the present invention is incorporated in a scale, designated generally by the reference numeral 10, which is generally rectangular in configuration and includes a base member 12 having a bottom wall 14 and four upstanding side walls 16, the bottom wall and side walls generally forming an open top housing for supporting the operational elements of the scale as seen hereinafter. An intermediate frame 18 having the same peripheral configuration as the base 12 is suitably secured to the base 12 and partially encloses portions of the operational elements that project above the walls 16 of the base 12. A platform 20 having the same peripheral configuration as the base 12 and intermediate frame 18, is mounted over the intermediate frame 18, but not in contact therewith, but rather rests on one of the operational elements of the scale 10 as described hereinafter. The intermediate frame 18 also includes openings 22 through which various control buttons project and a digital readout 23 to indicate the weight of an article placed on the platform 20.

Figure 3:
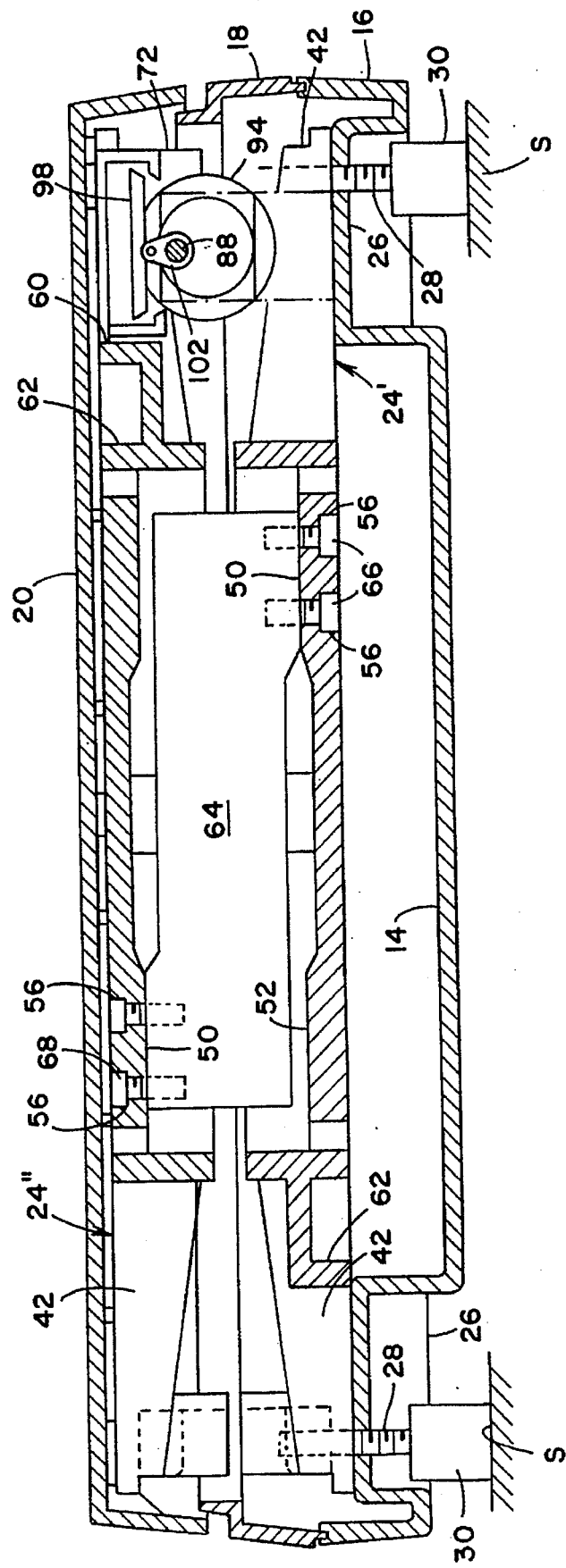
FIG. 3 is a sectional view taken on the line 2—2 of FIG. 2.
Figure 4:
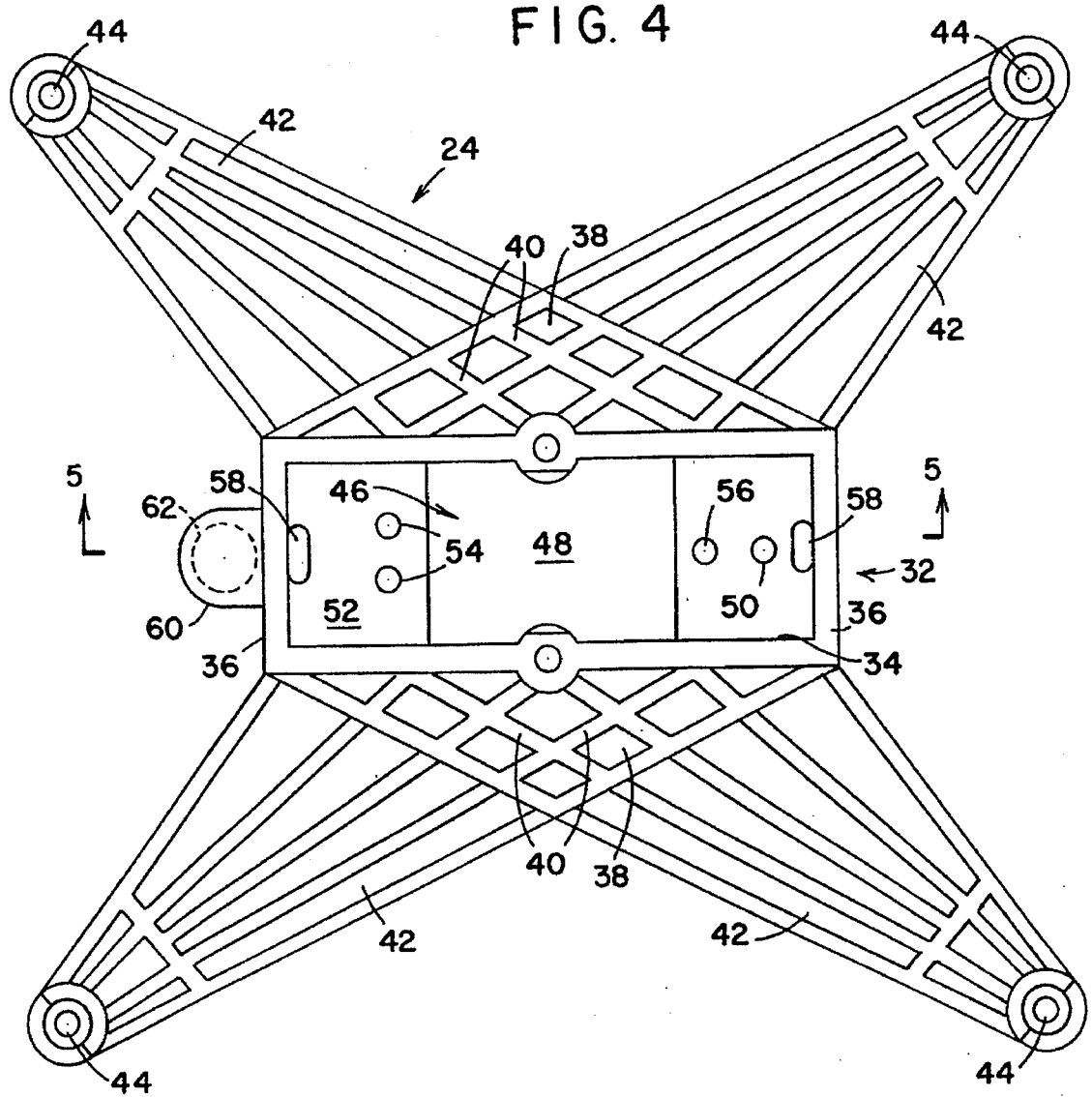
FIG. 4 is a bottom view of one section of a load cell supporting member.

As best seen in FIGS. 3, the base 12 does not rest on the supporting surface S, but rather is suspended slightly above the supporting surface S by being attached in a suitable manner to a load cell supporting member, designated generally by the reference numeral 24 in FIG. 2 and described in more detail below. The bottom wall 14 of the base 12 has an upstanding protuberance 26 which extends around substantially the entire periphery of the base 12 and on which the load cell supporting member 24 rests. Corner portions of the load cell supporting member 24 are provided with threaded holes 27 which receive correspondingly threaded leveling screws 28, which extend through holes 29 in the base 12 and the outer ends of which are covered with rubber feet 30 to provide a suitable cushion for the scale. Obviously, the scale can be leveled by turning any one or more of the leveling screws 28 to raise or lower the feet 30 with respect to the base 12.

Figure 5:
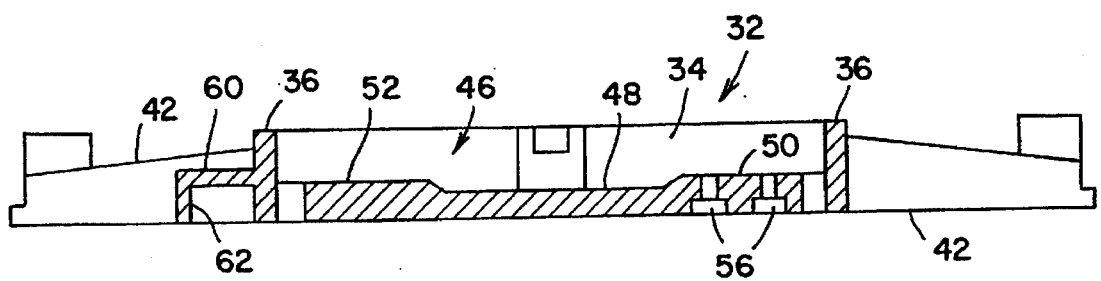
FIG. 5 is a sectional view taken on the line 5—5 of FIG. 4.
Figure 6:
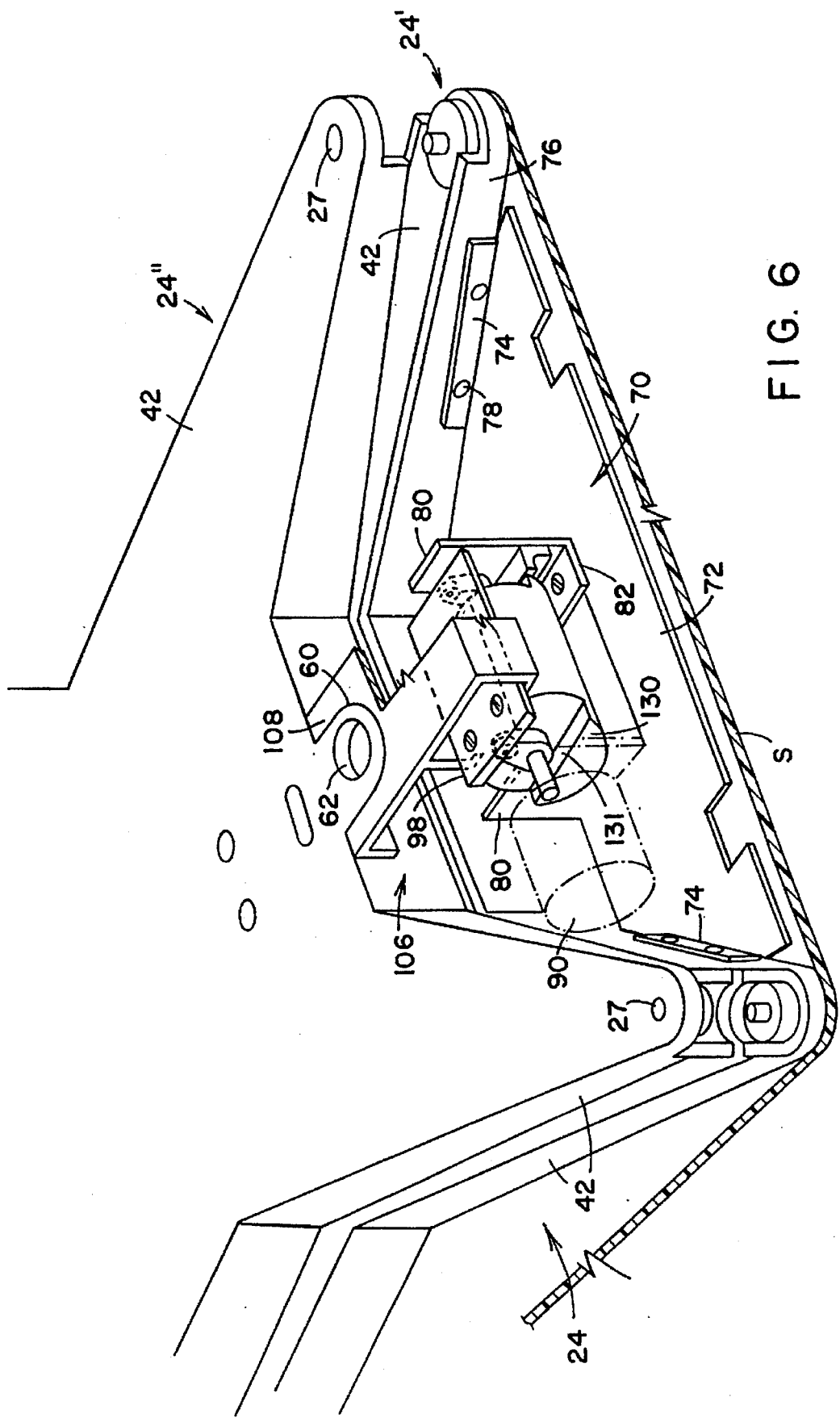
FIG. 6 is is a perspective view of the scale recalibrating apparatus mounted in the scale.

With reference to FIGS. 2 through 5, the load cell supporting member 24 is seen to comprise two identical load cell supporting members 24' and 24", one of which is seen in FIGS. 5 and 6. Thus, each member comprises a generally rectangular central portion, designated generally by the reference numeral 32, which has opposed long walls 34 and opposed short walls 36. The walls 34 and 36 form a walled perimeter of the central portion 32. Adjacent each of the long walls 34 is a triangular webbed portion 38 which includes webbing ridges 40. Two arms 42 extend diagonally from each webbed portion 38, with the result that the four arms 42 extend radially from the central portion 32 toward the four corners of the scale. The outer ends of the arms 42 are provided with the aforementioned threaded holes 27 which receive the leveling screws 28.

The central portion 32 includes an upwardly opening chamber 46 which encompasses the space between the long walls 34 and the short walls 36. The floor 48 of the chamber 46 includes spaced apart pads 50 and 52. The pad 52 includes paired circular clearance holes 54, and the pad 50 includes paired circular clearance holes 56. Elongate clearance holes 58 are formed respectively in pads 50 and 52 and are adjacent the short walls 36. All of the aforementioned holes extend completely through the floor 48 of the chamber 32. The circular holes 54 or 56, depending on the type of load cell used, are for mounting a load cell to each of the load cell supporting members 24' and 24". The elongate holes 58 are to accommodate passage of electrical lead wires (not shown) from a load cell to the scale electronics (also not shown). As best seen in FIGS. 5 and 6, the central portion 12 is provided with a longitudinal extension 60 from one of the short walls 36 which is provided with a recess 62 for receiving and holding a suitable bubble level to assist in leveling the scale by turning the leveling screws 28.

The chamber 46 receives a load cell 64, which is a conventional low profile load cell; its internal structure, including flexure members, strain gages and associated wiring, is well known to those skilled in the art and the details thereof form no part of the present invention; therefore these details are not further illustrated or described. The model PW 2C3 load cell, available from Hottinger Baldwin Measurements, Inc., Marlboro, Mass., and the model 1040 load cell, available from Tedea, Inc., Canoga Park, Calif., are two examples of a type of load cell that may be used with the scale 10.

As best seen in FIG. 3, the load cell 64 is captured in the enclosed space defined by the chambers 46 formed on each of the load cell supporting members 24' and 24" respectively. The load cell 64 rests on the raised pad 50 of the lower supporting member 24' and is attached thereto by a pair of screws 66 which pass through the openings 56 and are threadedly received in the load cell 64. The raised pad 50 of the other load cell supporting member 24" rests on the upper surface of the load cell 64 and is secured thereto by another pair of screws 68 which pass through the apertures 56 on this load cell supporting member. Thus, by this arrangement both of the load cell supporting members 24' and 24" are secured together to form the integral unit load cell supporting member 24 with the load cell 64 captured therebetween. This integral assembly is then inserted into the base 12 by inserting the leveling screws 29 and feet 30 through the holes 29 in the base 12 and securing the base 12 to the underside of the load cell supporting member 24' by any suitable means.

Referring now to FIGS. 6 through 11, the recalibrating device of the present invention, indicated generally by the refrerence numeral 70 in FIG. 6, functions, in a manner more fully described below. to periodically add a predetermined weight to the effective weighing mechanism of the scale so that a microprocessor can ascertain whether the scale is reading the weight of objects placed on the scale platform with the same degree of accuracy with which the scale measured weight when it was originally calibrated at the factory. Thus, the recalibrating device comprises an elongate base plate 72 shaped to fit between two of the arms 42 of the lower load cell supporting member 24' and rest on the upstanding protuberance 26 of the base 12. The base plate 72 is secured to the lower load cell supporting member 24' by means of a pair of upstanding flanges 74 which are secured to the side edge 76 of the adjacent arms 42 of the member 24' by any suitable means, such as the screws 78.

Figure 7:
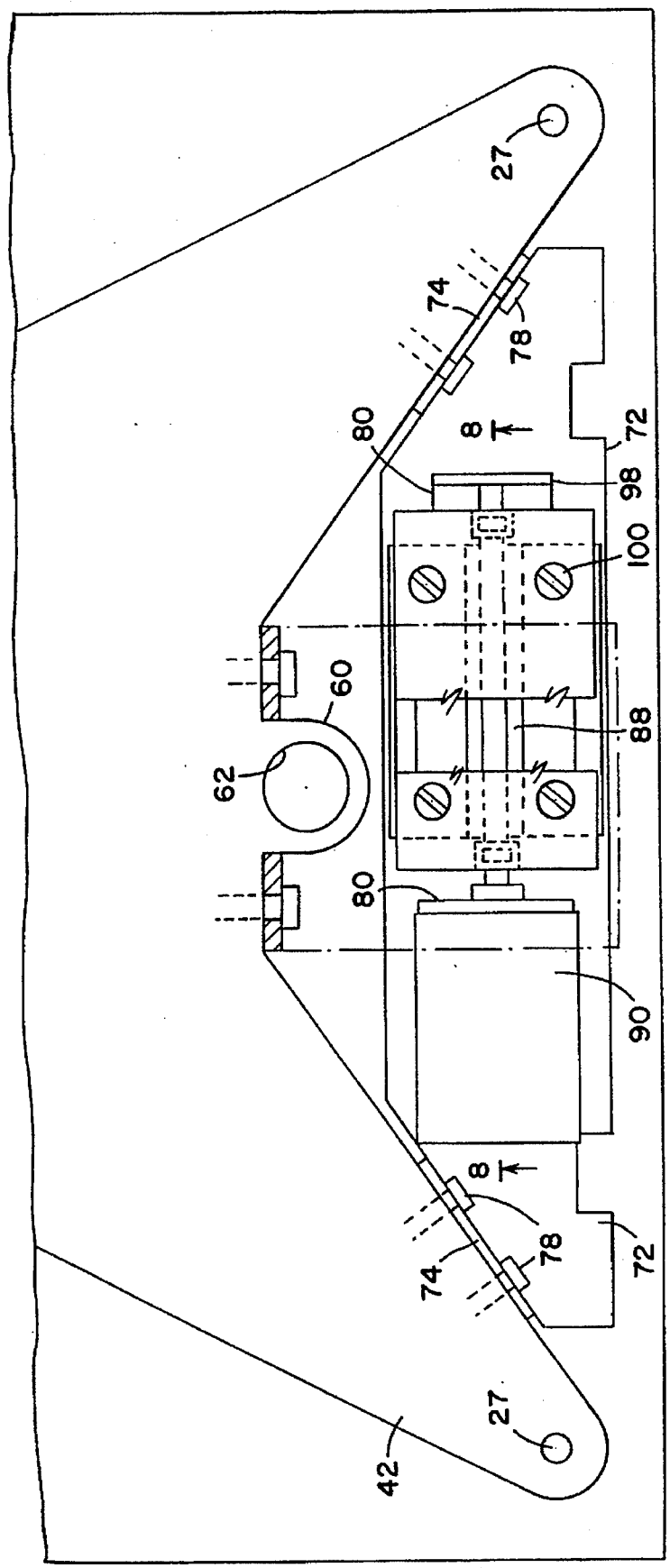
FIG. 7 is a plan view of the scale recalibrating apparatus.
Figure 8:
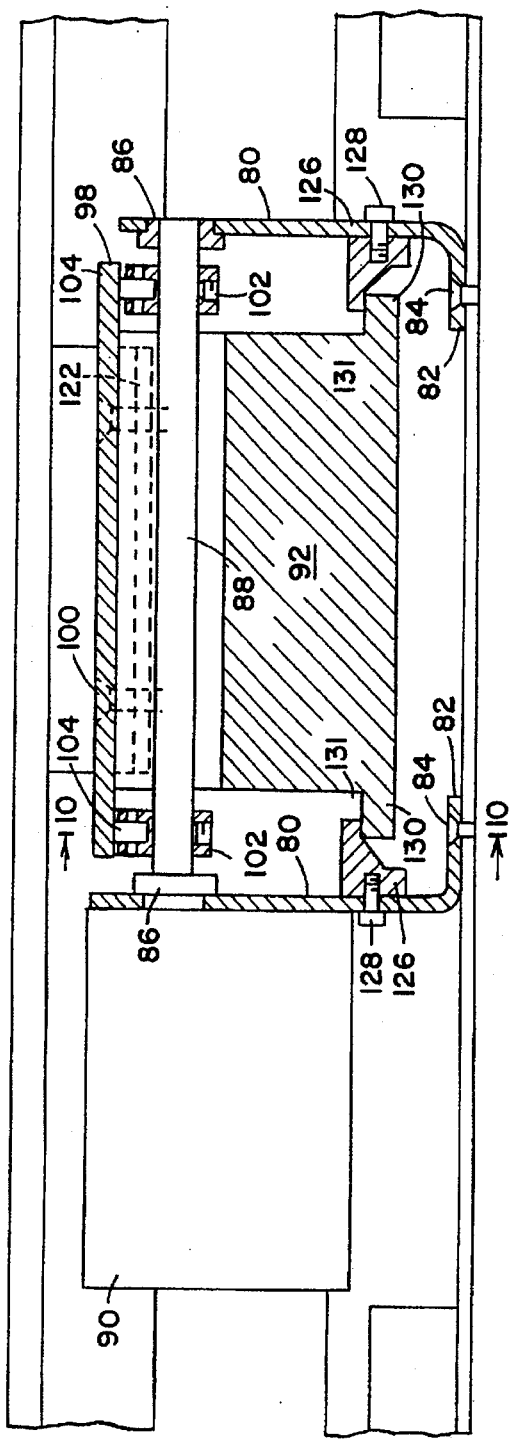
FIG. 8 is a a sectional view taken on the line 8—8 of FIG. 7 showing the recalibrating weight in its normal or inoperative position.
Figure 10:
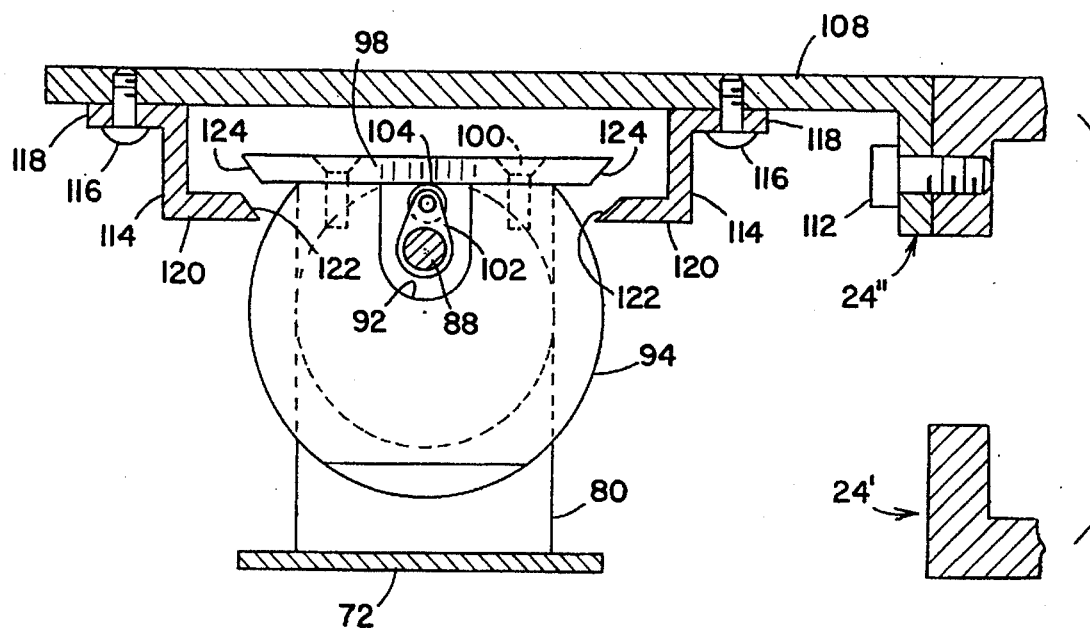
FIG. 10 is a sectional view drawn to an enlarged scale taken on the line 10—10 if FIG. 9 showing the recalibrating weight in its normal or inoperative position.
Figure 11:
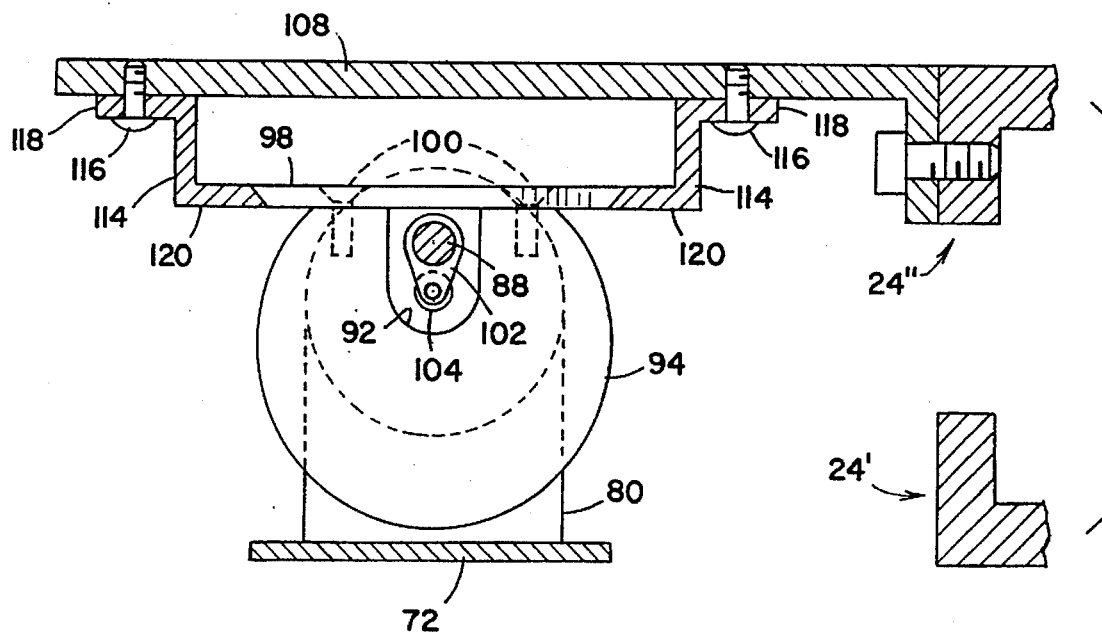
FIG. 11 is a view is a view similar to FIG. 10 but showing the recalibrating weight in its active or operative position.

A pair of upstanding plates 80 are secured to the base plate 72 by means of horizontal flanges 82 which are connected to the base plate 72 by the screws 84. The plates 80 supports a mechanism for alternately moving an object having a fixed predetermined weight from an inoperative position in which the object is merely suspended on the plates 80 and hence on the lower load cell supporting member 24', to an operative position in which the object is effectively resting on the upper load cell supporting member 24" so that the weight of the object is effectively added to the upper load cell supporting member 24" and therefore is measured by the load cell 64. Thus, as best seen in FIGS. 7 and 8, the upstanding plates 80 have shaft bearings 86 mounted therein which rotatably support a shaft 88, the shaft being connected to and turned by a small motor 90, which can be powered by any suitable internal or external source of electricity. The shaft 88 passes through a groove 92 formed in the upper portion of a generally cylindrical shaded object 94 which has a flat upper surface 96, as best seen in FIGS. 10 and 11. A flat plate 98 overlies the flat upper surface 96 of the object 94 and is secured thereto by the screws 100, thereby completely enclosing the shaft 88 within the groove 92. A pair of eccentric cams 102 are fixed on the shaft 88 adjacent opposite ends thereof, each cam rotatably supporting a cam roller 104. The flat plate 98 extends beyond the ends of the object 94 sufficiently far to overlie the cams 102, as best seen in FIGS. 8 and 9.

The weight of the object 94 is applied to the scale by a supporting bracket, indicated generally by the numeral 106 in FIG. 6. The bracket 106 comprises a generally horizontal top plate 108 having a pair of depending flanges 110 disposed on both sides of the extension 60 of the upper load cell supporting member 24" and secured to the side wall thereof as by the screws 112. The top plate extends outwardly far enough to completely overlie the entire recalibrating device, and a pair of somewhat Z-shaped plates 114 are secured to the underside of the top plate 108 on either side of the object 94 as by screws 116 passing through upper horizontal flanges 118. The Z-shaped plates have lower horizontal flanges 120 which project inwardly and terminate in spaced apart slanted surfaces 122, as best seen in FIG. 10. The plate 98, which is attached to the upper surface 96 of the object 94, has outer longitudinal slanted surfaces 124 which correspond to the slant on the surfaces 122, the spacing of the slanted surfaces 122 matching the distance between the slanted surfaces 124, so that when the plate 98 is lowered from the position shown in FIG. 10 to the position shown in FIG. 11, the Z-shaped brackets support the plate 98 and the object 94 attached thereto.

Figure 9:
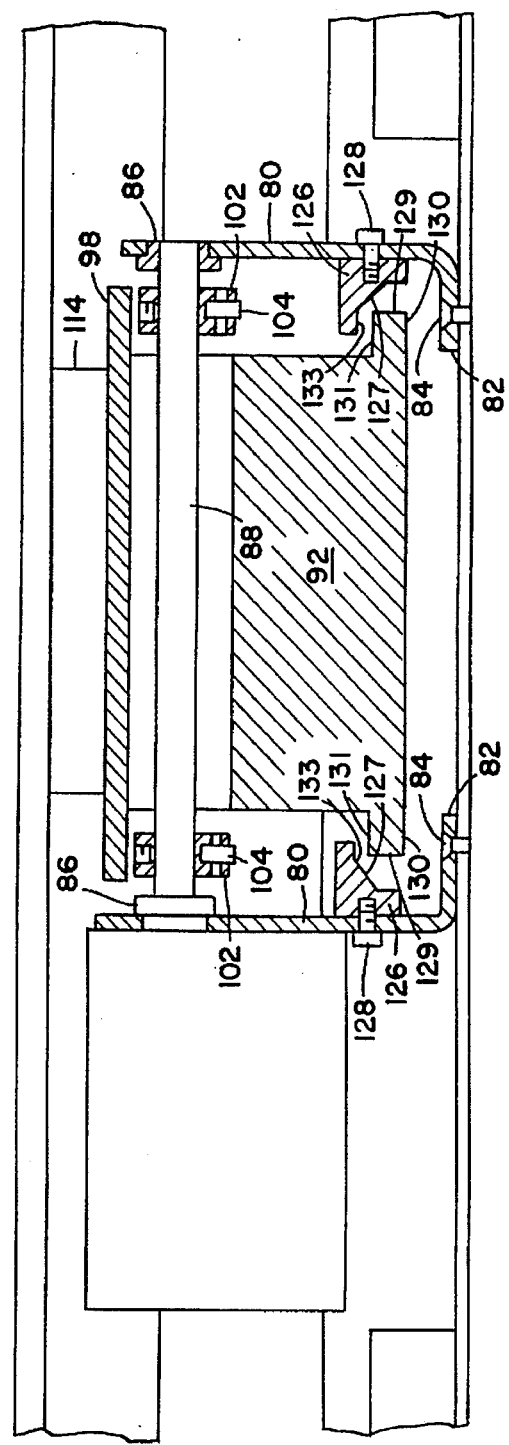
FIG. 9 is a view similar to FIG. 8 but showing the recalibrating weight in its active or operative position.

As best seen in FIGS. 8 and 9, a pair of abutment members 126 are suitably secured as by the screws 128 to the upstanding plates 80. These abutment members cooperate with longitudical extensions 130 formed on the ends of the object 94 and have flat upper surfaces which mate with the lower surfaces on the abutment members 126 to hold the object 94 in a fixed position when the object is in its inoperative position as shown in FIG. 10. This arrangment locks the object 94 against movement during shipping of the scale and also during periods of use when the scale is not being recalibrated.

The mechanical operation of the recalibrating mechanism 70 is as follows: With the parts in the position shown in FIG. 10, the object 94 is in its inoperative position since the plate 98 is resting on the cam rollers 104, thereby transferring the weight of the plate 98 and the object 94 to the shaft 88, upstanding plates 80 and the base plate 70 secured to the lower load cell supporting member 24'. When the motor 90 rotates the shaft 88 through 180°, the eccentric cams 102 move the cam rollers 104 out of contact with the underside of the plate 98 and allow the plate 98 to move downwardly until the slanted surfaces 124 on the plate 98 rest on the slated surfaces 122 on the lower flanges 120 of the Z-shaped plates 114, thereby placing the object 94 in its operative position as shown in FIG. 11. This effectively transfers the weight of the plate 98 and the object 94 to the upper load cell supporting member 24", which in turn transfers the weight to the load cell 64 so that the scale is now weighing the object 94 and plate 98. Further rotation of the shaft 88 by the motor 90 returns the object 94 and plate 98 to the inoperative position of FIG. 10.

Figure 12:
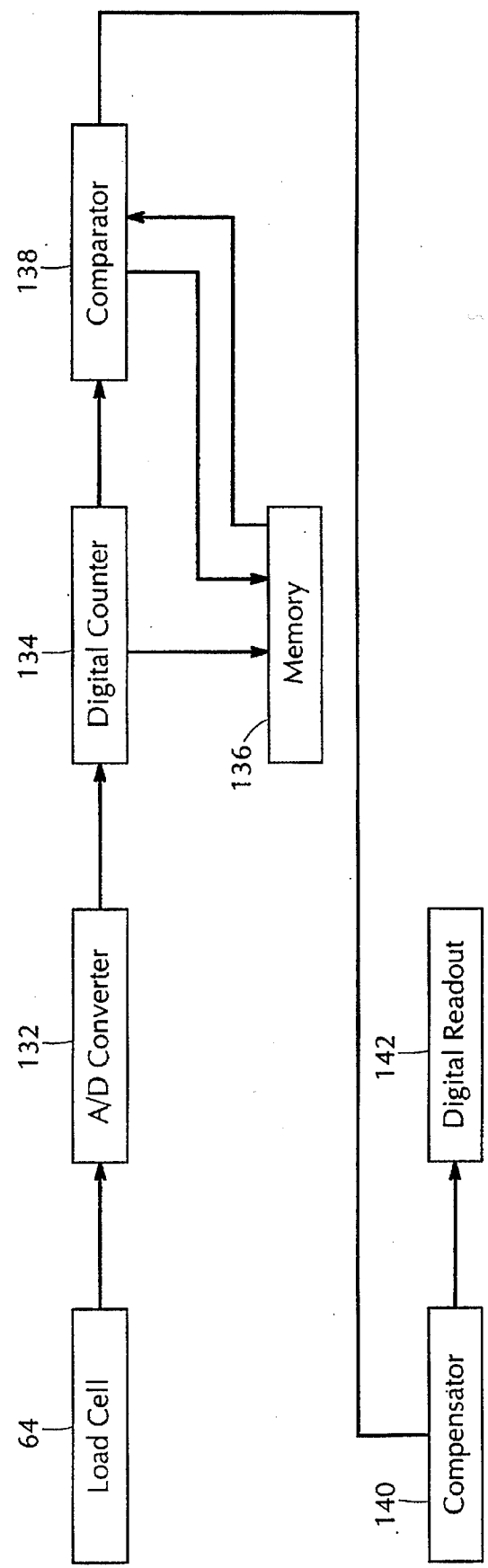
FIG. 12 is a schematic diagram of the major electronic control components of the scale with which the method of the present invention is carried out.

FIG. 12 represents in simple schematic form what occurs in the microprocessor of the scale when the weight of the object 94 and the plate 98 are applied to the load cell 64 of the scale, both at the factory when the scale is initially calibrated prior to shipment, and later at a site of installation or use when the scale is being recalibrated. The operating components of the microprocessor are not described or shown in detail since these details form no part of the present invention and are microprocessor components known in the art. At the factory, the completely manufactured scale is placed on a surface that is known to be perfectly level with respect to gravity, and the motor 90 is rotated to bring the object 94 to its operative position as shown in FIG. 11. The weight of the object, which need not be known (although it is generally about two pounds) but which must be absolutely invariable, is sensed by the load cell 64, which sends a votage indicative of the weight of the object 94 and plate 98 to an analog to digital/converter 132, which sends a digital signal to the electronic counter 134. At the factory, the count representing the weight of the object 94 and plate 98 are stored in a memory 136 which is not thereafter disturbed.

After the scale is shipped to an installation site, regardless of whether that side is fixed or is in a vehicle and subject to constant change, it is likely, almost certain, that the physical and/or environmental conditions prevailing at the site of installation will be different from those that prevailed at the factory, and hence the scale will not weigh accurately for any one or more of the reasons discussed hereinabove. Accordingly, the scale must be recalibrated. This is accomplished by actuating the motor 90 to rotate the shaft 88 to move the object 94 and plate 98 to the operative position as shown in FIG. 11. The load cell 64 again weighs the object 94 and plate 98 and sends the weight indicative signal to the analog/digital converter 132 which in turn sends the digital signal to the digital counter 134. The counter 134 now sends a signal indicative of the weight count of the object to a comparator 138 which seeks the count previously stored in the memory 136 and compares that count with the count just recorded from the counter 134. The comparator 138 then calculates the ratio of the count stored in memory to the count just recorded, and transfers that ratio to a compensator 140. The compensator 140 then adjusts the electronic control of the readout 142 by an amount that bears the same ratio as that of the original memory count of the weight of the object to the newly recorded count, so that the readout 142 will now indicate the accurate weight of any article placed on the scale platform 20.

Coming now to the detailed description of the method of the invention, and with particular reference to FIGS. 12 and 13, there are two preliminary steps which must be carried out in some form before the recalibrating steps of the present invention can commence. As an example, these are represented in FIG. 13 as Step A and Step B, and are carried out with any electronic scale, whether it has an automatic recalibration feature or not, which has just been assembled and must have the electronic control components initially calibrated before the scale can be shipped to an installation site. Thus, the scale is placed on a surface which is known to be absolute horizontal with respect to gravity at the factory and in an area having controlled physical and/or environmental condition and is connected to a suitable source of power. Next, as represented by the line labeled Step A in FIG. 13, an electronic count of the scale with 0 weight thereon is determined directly by the digital counter 134 and and this count is put into the memory 136. Thereafter, as represented by the line labeled Step B, a standard 70 lb. weight is applied to the scale and another electronic count is determined by the digital counter 134 with this weight on the scale, and this count is also put into the memory 136. The electronic count difference between the 0 weight count and the 70 lb. weight count is noted and remembered by the memory 136 as representing 70 lbs, and this electronic count difference is indicated on the line labeled Step B as $\Delta C$ (the letter C identifying the $\Delta$ count as a the initial calibration count). This is all that is required in the case of an electronic scale which does not incorporate the automatic recalibration feature of the apparatus invention disclosed hereinabove and claimed in the aforementioned copending application.

However, with a scale incorporating the automatic recalibration feature, two further calibration steps must be performed at the factory under the aforementioned controlled conditions in order to initially calibrate the electronic control components with respect to the automatic recalibration feature, and these steps are represented by the lines in FIG. 13 labeled Step C and Step D. Thus, an electronic count of the scale with 0 weight thereon is again determined directly by the digital counter 134 and this count is again put into the memory 136. The reason for repeating the determination of the electronic count with 0 weight on the scale is that when first done, the count is taken very quickly, in a second or less, because the degree of accuracy of this count when compared to the count of a 70 lb. weight is satisfactory for intially calibrating the scale. But when the 0 weight count is taken for comparison with the fixed predermined weight in the scale, which as noted hereinabove is approximately 2 lbs., the count is taken much more accurately, lasting from 20 to 30 seconds.

When this step is completed, the microprocessor control activates the motor 90 to apply the auto-calibration weight to the scale in the manner described hereinabove, and an electronic count with this weight applied to the scale is determined by the digital counter 134 and put into the memory 136. The electronic count difference between the 0 weight count and the auto-calibration weight count is noted and remembered by the memory 136, and this electronic count difference is indicated on the line labeled Step D as $\Delta ACO$ (the letters ACO identifying this $\Delta$ count as the initial auto-calibration weight calibration count at the site of origin). This completes the calibration steps performed at the site of origin (usually the factory) under the controlled conditions there prevailing.

The scale is now ready to be shipped to an installation site at which the scale will probably operate under physical and/or environmental conditions different from those which prevailed at the site origin. As previously explained, without more the scale may not weigh accurately, and an object placed on the scale may weigh slightly more or less than its true weight, depending on the nature of the differences between the physically and/or environmental conditions at the site of origin and those at the factory. Therefore, the scale must be recalibrated in order to obtain an accurate weight reading for the object.

At the site of installation, and at a time which is predetermined according to certain parameters fully explained below, the recalibration mechanism described above is activated to go through a recalibration cycle. The first step of the cycle is to again determine an electronic count of the scale with 0 weight thereon by the digital counter 134 and again put this count into the memory 136, as represented by the line labeled Step E in FIG. 13. When this is completed, the microprocessor control again activates the motor 90 to apply the auto-calibration weight to the scale in the manner described hereinabove, and an electronic count with this weight applied to the scale is again determined by the digital counter 134 and put into the memory 136. The electronic count difference between the 0 weight count and the auto-calibration weight count is noted and remembered by the memory 136, and this electronic count difference is indicated on the line labeled Step F as $\Delta ACI$ (the letters ACI identifying this $\Delta$ count as the auto-calibration weight calibration count at the site of installation).

Now that the two electric count differentials $\Delta ACO$ and $\Delta ACI$ have been determined and stored in the memory, the next step is to compare the two electric count differentials and to establish a ratio of the former over the latter, which can be represented by the formula $$R = \frac{\Delta ACO}{\Delta ACI}$$

and this ratio is stored in the memory 136. This ratio is ratio is indicative of the degree of error of the electronic count differential at the site of installation between the scale with 0 weight thereon and with an article of unknown weight which will be placed thereon at the site of installation, as described more fully below. Thus, when the article of unknown weight is placed on the scale at the site of installation, the electronic count differential between the scale with 0 weight thereon and with the arfticle of unknown weight thereon is recalculated according to the ratio R so as to compensate this electronic count differential for the variations in physical and/or environmental conditions under which thescale is operating at the site of installation.

At this point, the basic method of recalibrating the scale to indicate accurate weight measurements of articles being weighed under physical and/or environmental conditions at a site of installation which are different from those prevailing at the site of origin is complete. However, there are two further aspects of the present invention which will now be described. The first is that the steps of recalibrating the scale at the site of installation are repeated at various times and/or under changes in various circumstances so as to maintain the accuracy of the scale despite any changes in the physical and/or environmental conditions under which the scale is operating.

One condition under which these steps are repeated is that of when the scale is powered up. This condition would occur, for example, when the scale is first installed at a site of installation, or if power is interrupted for any reason, such as moving the scale from one location to another at the same site or if there is temporary power failure. There are various ways of accomplishing this, such as a manual control for activating the motor 90 to cause the recalibrating apparatus described above to commence a recalibration cycle. Another way is to provide a suitable form of power sensor that would activate the motor 90 each time the power sensor is energized by the application of power thereto.

Another condition under which the recalibrating steps at the site of installation could be performed is simply at predetermined intervals of time, regardless of any changes in other circumstances. This can be accomplished conveniently by providing a suitable timing device, such as a count down timer in the electronic controls of the scale, which would trigger the motor 90 to commence a recalibration cycle either at constant or varying intervals of time.

Still another condition under which the recalibrating steps could occur is that of removal of the scale from one site of installation to another where the physical and/or environmental conditions at the latter may be different from those at the former. This can be accomplshed by providing a suitable sensing device which will sense the conditions of a period of excessive electronic noise from the load cell followed by a predetermined period of quiet, thereby indicating that the scale has been physically moved and then reinstalled.

Finally, it should be noted that any or all of the foregoing methods of initiating a recalibrating cycle under the appropriate could be combined to maintain the accuracy of the scale under all forseen conditions.

The second of the abovementioned aspects of the method of this invention is that it can be extended beyond the mere recalibration of the scale to include a method of obtaining an accurate indication of the weight of an article at a site of installation which includes all of the steps set forth above for carrying out the method of recalibrating the scale, plus additional steps which are carried out subsequent to completion of recalibrating the scale which cause it to provide an indication of the accurate weight of the article.

Thus, still referring principally to FIG. 13, when it is desired to weigh an article, the microprocessor is first activated to determine an electronic count of the scale with 0 weight thereon by the digital counter 134, as indicated by the line labeled Step. G, and this count is put into the memory 136. The article of unknown weight is then placed on the scale platform and another electric count is determined by the digital counter 134, as indicated by the line labeled Step H. This count is put into the memory 136 so that the memory can calculate a third electronic count differential between the scale with 0 weight thereon and with the article of unknown weight thereon, which is indicated on the Step H line by the designation $\Delta$UWI (the letters UWI identifying this $\Delta$ count as the unknown with count at the site of installation).

The next step is that the $\Delta$UWI is multiplied by the ratio R to adjust the $\Delta$UWI to compensate for the difference in physical and/or environmental conditions under which the scale is operating at the site of installation, which can be represented by the formula $$\text{Adjusted } \Delta UWI = \Delta UWI \times R, \text{ or } \frac{\Delta UWI \times \Delta ACO}{\Delta ACI}$$

This step is carried out by the compensator component 138 in the particular form of the recalibrating apparatus disclosed hereinabove.

Finally, the adjusted $\Delta$UWI is converted from digital count form to information recognizable by the digital readout for driving the digital readout to cause it to display the actual weight of the article, this step being carried out by the compensator 140 in the disclosed recalibrating apparatus.

Thus, with the three steps just described added to those previously described for recalibrating the scale, the digital readout will accuratelly display the weight of an article placed on the scale regardless of any variations in the physical and/or environmental conditions between the site of origin and the site of installation.

Figure 14:
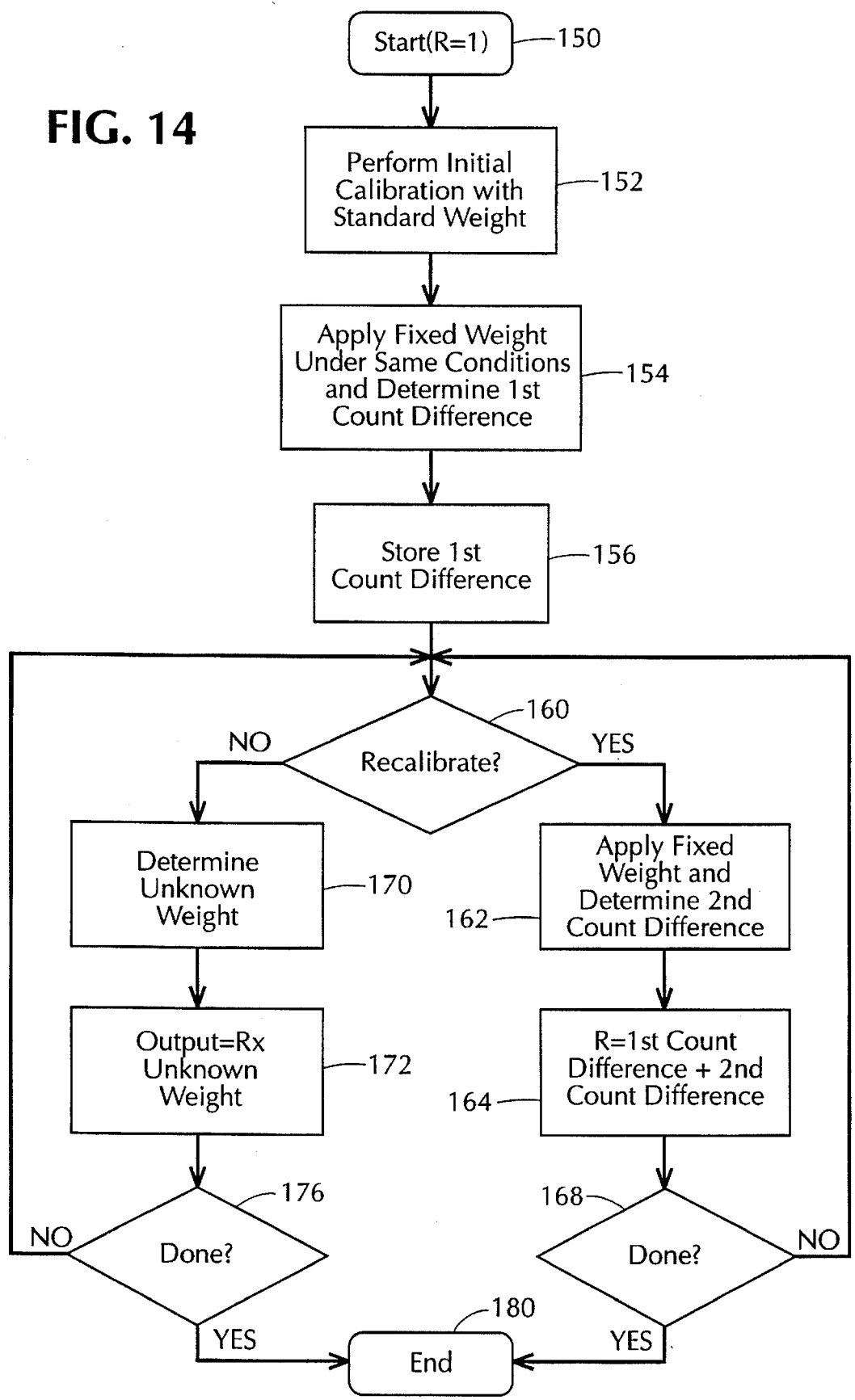
FIG. 14 is a flow diagram of the method of the subject invention.

FIG. 14 shows a flow chart of the method of the subject invention. At 150 R is initially set equal to 1. Then at 152 the scale is initially calibrated with a precisely known standard weight in a conventional manner, as described above. Then at 154 a fixed weight is applied to the scale and a first count difference between the scale output with the fixed weight applied and the scale output with zero weight applied is determined under essentially the same conditions as prevailed at step 152.

Note that the fixed weight need not have a precisely known value but must have an unvarying value. Preferably this is achieved by providing the scale with a mechanism to automatically apply an object to the weighting mechanism of the scale. Also, in a preferred embodiment, the fixed weight will have a value substantially less than that of the standard weight and the count difference will be determined with a greater accuracy.

Then at 156 the first count difference is stored in the scale.

At 160, at a later time and presumably under different conditions a decision is made whether or not to recalibrate the scale. As described above, this decision may be based on any reasonable factors which indicate that condition may be sufficiently different as to require recalibration, such as movement of the scale to a new location, passage of a predetermined time period, or application of power to the scale. If the decision is made to recalibrate then at 162 the fixed weight is again applied to the scale and a second count difference is determined. At 164 R is set equal to the ratio of the first count difference to the second count difference. Then at 168 a decision is made whether or not the operator is done using the scale. If so the method ends at 180. Otherwise the method returns to 160.

If at 160 it is determined that is not necessary to recalibrate, then at 170 an unknown weight is determined in a conventional manner and at 172 the output is set equal to R times the unknown weight. Then at 176 a determination is made whether or not the operator is done with the scale and if so the method ends at 180 and if not returns to 160.

It is to be understood that the methods of the present invention are not to be considered as limited to the practice of the specific steps described above, which are merely illustrative of the best mode presently contemplated for carrying out the methods of the invention and which are susceptible to such changes as may be obvious to one skilled in the art, but rather that the methods of the invention are intended to cover all such variations, modifications and equivalents thereof as may be deemed to be within the scope of the claims appended hereto.

We claim:

1. A method of recalibrating a scale which has been previously calibrated with a precisely known weight, comprising the steps of:

a) applying a fixed weight to said scale under conditions essentially identical to conditions under which said scale was calibrated;

b) determining a first electronic count difference representative of said fixed weight;

c) storing said first electronic count difference in said scale;

d) at a later time, making a determination to recalibrate said scale and again applying said fixed weight to said scale;

e) determining a second electronic count difference representative of said fixed weight at said later time f) retrieving said first electronic count difference and computing a ratio of said first and second electronic count differences and storing said ratio in said scale; and g) said scale thereafter applying said ratio to weight measurements made by said scale, whereby said scale is recalibrated with respect to conditions at said later time.

2. A method as described in claim 1 wherein said precisely known weight is substantially heavier than said fixed weight and said first and said second electronic count differences are determined more accurately than said precisely known weight is measured to initially calibrate said scale.

3. A method as described in claim 2 wherein said determination is made each time power is applied to said scale.

4. A method as described in claim 2 wherein said determination is made at predetermined time intervals.

5. A method as described in claim 2 wherein said determination is made when said scale is moved to a new location.

6. A method as described in claim 1 wherein said determination is made each time power is applied to said scale.

7. A method as described in claim 1 wherein said determination is made at predetermined time intervals.

8. A method as described in claim 1 wherein said determination is made when said determination is made when said scale is moved to a new location.

9. A method as described in claim 1 wherein said fixed weight is automatically applied to said scale by a mechanism incorporated in said scale for transferring an object having said weight from an inoperative position to an operative position wherein said object is weighted by said scale.

* * * * *